United States Patent [19]

Rodgers, Sr. et al.

[11] Patent Number: 5,007,179
[45] Date of Patent: Apr. 16, 1991

[54] COLD AIR LOCK VAPOR SEAL FOR PROCESS SOLVENT VAPOR RECOVERY AND CONTROL

[75] Inventors: Joel E. Rodgers, Sr., Convent Station, N.J.; Ambrose J. Schmitz, Lake Barrington, Ill.; Alton D. Romig, Mine Hill, N.J.

[73] Assignee: Allied-Signal Inc., Morris Township, Morris County, N.J.

[21] Appl. No.: 410,216

[22] Filed: Sep. 21, 1989

[51] Int. Cl.$^5$ .......................... F26B 3/00; F26B 21/06
[52] U.S. Cl. ............................................ 34/22; 34/32; 34/74; 34/78; 34/209
[58] Field of Search .................... 34/77, 78, 73, 74, 32, 34/22, 209, 37; 228/180.1, 180.1; 432/197; 118/61, 729

[56] References Cited

U.S. PATENT DOCUMENTS

| | | |
|---|---|---|
| 2,137,479 | 11/1938 | Dinley . |
| 3,375,177 | 3/1968 | Rand . |
| 3,767,300 | 10/1973 | Brown et al. . |
| 3,904,102 | 9/1975 | Chu et al. . |
| 4,261,111 | 4/1981 | Rand . |
| 4,348,174 | 9/1982 | Spigarelli . |
| 4,389,797 | 6/1983 | Spigarelli et al. . |
| 4,494,317 | 1/1985 | Biagi et al. . |
| 4,600,608 | 7/1986 | Ankrett . |
| 4,658,513 | 4/1987 | Strattman . |

Primary Examiner—Henry A. Bennett
Attorney, Agent, or Firm—Jay P. Friedenson

[57] ABSTRACT

A solvent vapor control apparatus used in conjunction with a degreaser or defluxer into which articles to be degreaser or defluxed are conveyed into intimate contact with liquid solvent and/or a vapor phase thereof is disclosed. The vapor control apparatus includes a housing having a conveyor flow path with an inlet opening in communication with solvent vapor in the degreaser/defluxer and an outlet in communication with ambient air. The inlet is preferably disposed elevationally above the solvent vapor zone to impede outflux of solvent vapor. A baffle defining the uppermost extent of the conveyor flow path establishes a low point in the path disposed elevationally below adjacent upstream and downstream sections of the path. The low point is provided with chilled air which condenses solvent vapor as the articles are forced to enter the chilled air section. Solvent condensate is recovered and a separate drain is provided to collect water condensate from ambient air entering the chilled air section through the flow path outlet. The solvent vapor control arrangement may be provided as retrofit additions to one or both entrance and exit ends of the degreaser/defluxer or may be constructed as integral components of new or existing degreasing/defluxing equipment. A method of recovering solvent vapor is also disclosed.

37 Claims, 3 Drawing Sheets

COLD AIR LOCK VAPOR SEAL FOR PROCESS SOLVENT VAPOR RECOVERY AND CONTROL

TECHNICAL FIELD

The present invention relates generally to method and apparatus for cleaning articles such as printed circuit boards with a solvent in a vapor degreaser or solvent defluxer. More particularly, the invention relates to enhancing recovery of solvent vapor by limiting or preventing its outflux from the degreaser/defluxer through entrance and/or exit ends thereof.

BACKGROUND ART

Degreasers or defluxers are commonly used for degreasing, precision cleaning and defluxing of various articles, such as removing solder flux from printed circuit boards. The articles are typically conveyed through one or more zones within the degreaser/defluxer for contact with a solvent, such as fluorocarbon based CFC-113, manufactured by Genesolv/Baron-Blakeslee, Melrose Park, Ill., a division of Allied Signal, Inc., assignee of the present invention. The articles are cleaned by entering the degreaser on a conveyor through an entrance end thereof for passage through a solvent vapor zone, immersion within a liquid solvent, solvent spraying, or any combination thereof. The articles are then conveyed from the degreaser/defluxer through an exit end.

The entrance and exit ends of conventional in-line conveyer type degreaser and defluxer equipment are generally in open communication with both the ambient environment and the solvent within the equipment. Consequently, there is a loss of solvent from within the equipment to the surrounding environment caused by solvent vapor being carried off by normal air movement; this problem is exacerbated by air drafts entering the equipment through the entrance and/or exit ends and creating turbulence therewith.

Solvent vapor loss also occurs by vapor diffusion as the solvent covered articles exit the equipment. This evaporation problem is primarily caused by the relatively high ambient temperature conditions prevailing at the entrance and exit ends of the degreaser/defluxer. Air at ambient temperature entering the degreaser/defluxer through the entrance or exit ends also upsets the control temperature environment within the equipment (e.g., the use of chill coils which create a low temperature inversion blanket over a hotter vapor zone region in the degreaser/defluxing tank, such as disclosed in U.S. Pat. No. 4,261,111 to Rand). In addition, the relatively humid ambient air creates undesirable moisture within the tank which interferes with the defluxing/degreasing process.

The use of CFC-113 and FREON type solvents and vapor diffusion thereof into the environment also contributes to undesirable stratospheric ozone depletion. Consequently, it is expected that HCFC type solvents, which affect the environment significantly less than the CFC-113 and FREON type solvents, will replace the latter in accordance with environmentally safe operating principles. However, since these new HCFC solvents boil at much lower temperatures (82° F.–86° F.) than the above solvents being currently used, solvent loss as a result of vaporization is likely to increase.

DISCLOSURE OF THE INVENTION

It is accordingly one object of the present invention to provide degreasing or defluxing apparatus which is effective in preventing the escape of solvent vapors from process equipment to the surrounding environment.

Another object of the invention is to provide degreasing or defluxing apparatus of the in-line conveyor type utilizing a novel baffling and/or conveyor flow path arrangement at the entrance and/or exit ends of the equipment to control and impede movement of air from the surrounding ambient environment into the equipment and thereby prevent solvent loss.

Still another object is to provide a novel conveyor flow path and baffling arrangement at the entrance and/or exit ends of the equipment which both provides a controlled low temperature environment and vapor recovery system to prevent solvent loss and dehumidifies ambient air tending to enter the equipment from the surrounding environment.

Yet a further object of the present invention is to provide a novel conveyor flow path and baffling arrangement which is incorporated, with or without refrigeration equipment providing the low temperature (chilled) environment, in separate housing units that may be connected to the entrance and/or exit ends of conventional in-line conveyor degreasing/defluxing equipment as retrofit additions, or by incorporation into existing degreasing equipment by appropriate modification thereof.

Still a further object is to provide a novel conveyor flow path and baffling arrangement for the entrance and exit ends of degreasing/defluxing equipment which allows for use of solvents which boil at low temperatures such as 82° F.–86° F.

A solvent vapor control arrangement for limiting the outflux of a solvent vapor from within a degreaser or defluxer having entrance and exit ends through which articles enter and exit the equipment is disclosed. In accordance with the invention, the control arrangement comprises a housing containing a conveyor flow path through which articles subjected to solvent degreasing/defluxing enter and/or exit the equipment along the flow path. The flow path is arranged, in cooperation with baffling defining the uppermost extent of the flow path, to have a low region or "valley" at an intermediate location thereof through which all the articles are conveyed. The low region is supplied with chilled air to establish a chilled air section in the conveyor flow path. The chilled air in this section is maintained at a temperature below a boiling temperature of the solvent to enable condensation of solvent vapor from the degreaser/defluxer to occur in the flow path. Solvent condensate is drained and collected to achieve solvent recovery.

The housing is preferably formed from a pair of side body members and a top member and is open at opposite ends thereof. In one embodiment of the invention, the flow path is defined by a belt type conveyor having an upper run disposed within an upper portion of the housing. The flow path has an inlet opening at one end of the housing. The inlet opening communicates with the interior of the degreaser/defluxer The flow path has an outlet opening at an opposite end of the housing remote from the degreaser/defluxer which communicates with ambient air. The conveyor belt, preferably a wire type belt, rests upon guides secured to the side body members within the housing. The guides locate the upper run to define a curved path that first extends downward from the inlet opening to a lowermost position and then upwards toward the outlet opening. The overhead baffling preferably includes first and second baffles connected together at approximately their lowest point directly above the lowermost portion of the conveyor upper run. The baffles are respectively inclined upwardly towards the associated inlet and outlet openings. With this novel arrangement, articles exiting (or entering) the degreaser/defluxer along the conveyor upper run are "forced" into the chilled air section of the conveyor flow path lowermost portion where solvent vapor is condensed. The solvent condensate is collected on a V-bottom trough extending beneath the conveyor upper run and drained from the housing to achieve solvent recovery.

Cooling of the chilled air section is preferably achieved by means of chill coils disposed within the trough beneath the conveyor upper run. The chill coils may be connected to refrigeration equipment mounted within the housing beneath the trough. The refrigeration equipment may also be provided as a separate unit located outside the housing connected to the chill coils (at one or both ends of the cold air lock vapor seal equipment of the invention) with refrigerant lines.

Optionally, chill coils may also be mounted above the conveyor upper run and beneath the baffle for improved chilling effect.

The aforesaid orientation of the baffling and the curvature of the conveyor upper run allows articles to be moved into and/or out of a degreaser/defluxer processing tank in a continuous manner while advantageously impeding the flow of ambient air from the flow path outlet into the degreaser/defluxer through the inlet to minimize air movement therewithin.

It is another preferred feature of the present invention to locate the inlet opening of the housing in direct communication with an interior portion of the degreaser/defluxer located elevationally above the solvent vapor line. Since the solvent vapors are heavier than air, the higher positioning of the inlet opening advantageously serves to prevent solvent vapors from the vapor zone from entering the low temperature controlled conveyor flow path.

The chilled air section in the conveyor flow path is preferably divided into a low air temperature control section on the downwardly curved side of the flow path closest to the inlet opening (i.e., the machine side) and an ambient air temperature reducing section on the opposite, upwardly curved side of the low point extending towards the outlet and ambient air (i.e., the non-machine side). The V-bottom trough is provided with separate drains beneath the conveyor upper run within the respective sections; the drains are located on opposite sides of and adjacent the low point of the V-bottom. Thereby, ambient air entering the ambient air temperature reducing section from the conveyor flow path outlet is cooled to a temperature sufficient to condense water vapor (i.e., dehumidify) in the ambient air and thereby avoid the influx of humid air into the degreaser/defluxer. The water condensate is drained from the ambient air reducing section. On the machine side, solvent laden articles are continuously conveyed from the degreaser/defluxer through the conveyor flow path inlet into the low air temperature control section where they are exposed to the chilled air. The solvent vapor condenses and is collected on the trough, together with liquid solvent dripping from the articles, where it flows into a drain and recovery system which is separate from the water drain and recovery system.

Optionally, a flexible curtain extends through the low point of the conveyor flow path between the baffle and conveyor upper run to advantageously further limit air movement between the two sections and to avoid creating turbulence within the degreaser/defluxer. The flexible curtain, such as soft bristles, is yieldable upon contact with the articles being continuously conveyed through the low point towards the conveyor outlet.

Optional pairs of flexible curtains may also be located in the conveyor flow path outlet proximate the discharge end of the conveyor upper run to further inhibit the influx of humid air into the chilled air section. One flexible curtain of the pair extends between the downstream end of the second baffle (in the ambient air reducing section) to a point just above or in contact with the conveyor upper run. The second flexible curtain of the pair extends upwardly from the bottom of the trough to a point just beneath the conveyor upper run elevationally proximate the conveyor guides. The pair of flexible curtains, by assisting in preventing ambient air from entering the ambient temperature reducing section, also limits undesirable air currents and turbulence associated with such ingress of ambient air into the conveyor flow path.

A method is also disclosed for limiting outflux of a solvent vapor from a degreaser/defluxer containing a supply of solvent through which articles to be degreased are conveyed from an entrance end of the degreaser/defluxer for discharge through an exit end. In accordance with the invention, the method comprises the steps of conveying the articles from the entrance end into contact with at least one of a solvent supply or vapor zone thereof and then directing the articles from contact with the solvent supply or vapor thereof through the conveyor exit end. The articles are caused to pass through a conveyor flow path in the exit end which is provided with chilled air in a flow path section that is elevationally lower than flow path sections disposed upstream and downstream from the chilled air section. By "forcing" the solvent laden articles through the chilled air section of the flow path, solvent vapor is condensed in the chilled air section and collected for reuse.

The chilled air section also dehumidifies ambient air entering the flow path from a flow path outlet in communication with ambient air. Water condensate is collected and drained from the chilled air section and a separate collection and recovery system is provided for collecting solvent condensate.

Still other objects and advantages of the present invention will become readily apparent to those skilled in this art from the following detailed description, wherein only the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BEST MODE FOR CARRYING OUT THE INVENTION

Figure 1:
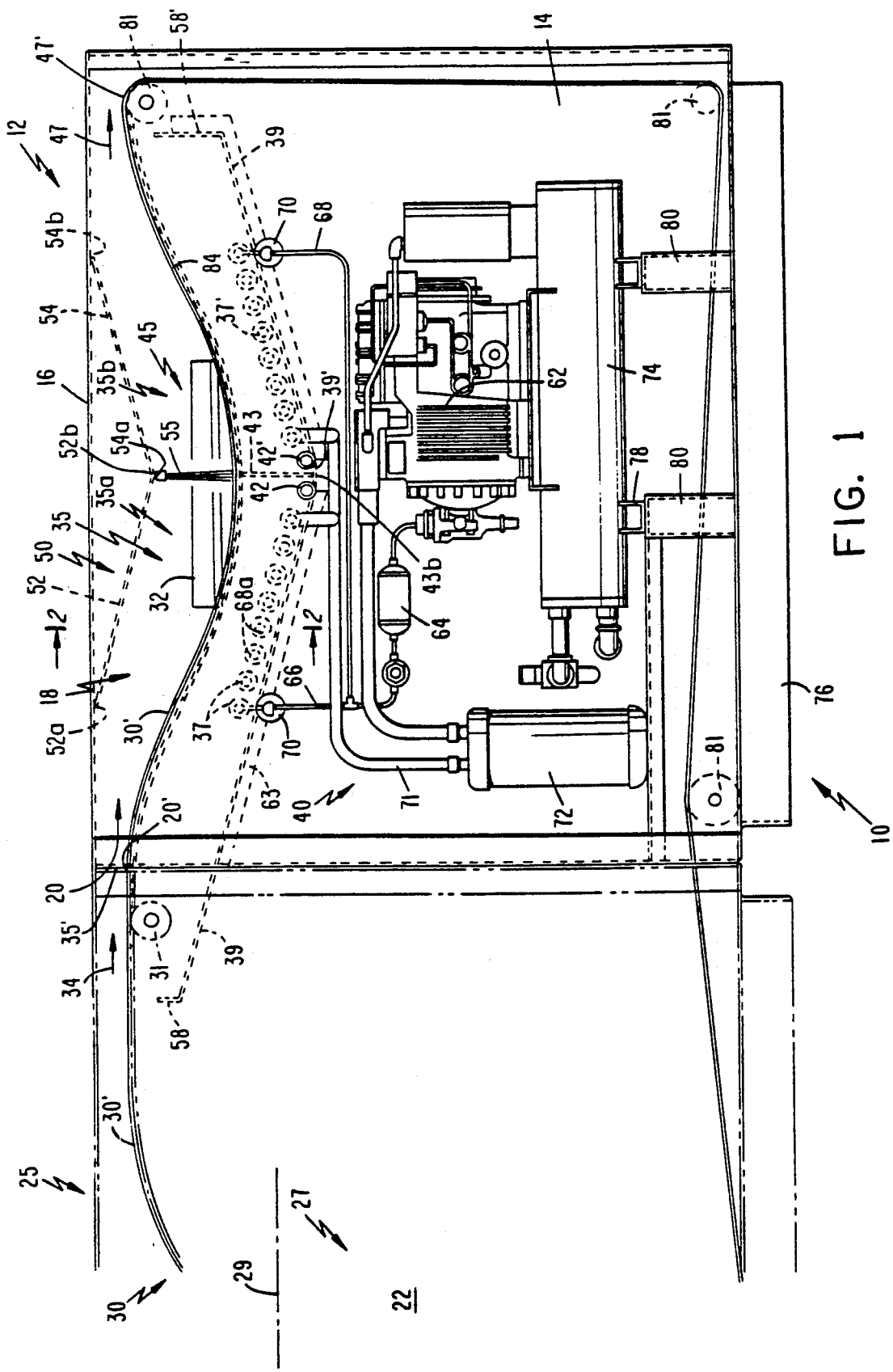
FIG. 1 is a partial schematic and partial vertical sectional view through the solvent vapor control arrangement of the present invention.
Figure 2:
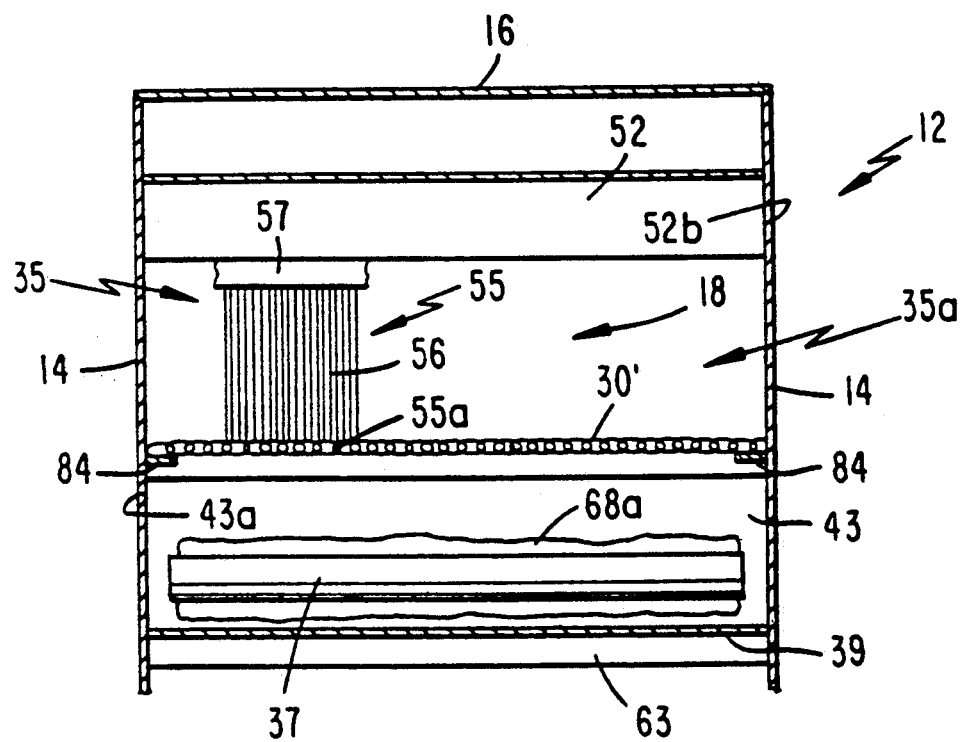
FIG. 2 is a sectional view taken along the line 2—2 of FIG. 1.

Referring to FIGS. 1 and 2, solvent control apparatus 10 of the present invention includes a housing 12 having side body members 14, a top body member 16 and a conveyor flow path 18 preferably provided in an upper portion thereof. The flow path 18 has an inlet opening 20 in open communication with a working chamber 22 of a conventional in-line, conveyor type degreaser or defluxer 25. The working chamber 22 typically contains a supply of solvent (not shown) to which heat is applied in a known manner to effect solvent vaporization and create a vapor zone 27 having a upper limit 29. A chain conveyor 30 (e.g., wire type conveyor belts 30, trained around one or more sprockets 31) conveys articles 32 such as circuit boards through degreaser/defluxer 25 and into intimate contact with solvent vapor in vapor zone 27 where cleaning occurs. The solvent laden, cleaned articles 32 are then conveyed through exit end 34 of the degreaser/defluxer 25 into the conveyor flow path 18 through the inlet opening 20 which is connected (preferably sealed by welding as at 35') to the exit end.

The flow path defined by upper run 30' is a curved path that first extends downward from the inlet opening 20 to a lowermost portion 35 and then upwards toward outlet 47.

As the solvent laden, cleaned articles 32 are initially conveyed through flow path 18, they enter into lowermost section 35 thereof in which the air in the flow path is cooled by means of chill coils 37 extending beneath the downwardly curved portion of conveyor upper run 30'. Chill coils 37 are connected to a coolant circuit 40 in the manner described more fully below. In the chilled air section 35, a "cold air lock" is effectively generated in which the prevailing low temperature is sufficient to condense solvent vapor. The resulting solvent condensate settles into a V-bottom trough 39 extending between side body members 14 beneath the chain conveyor. The trough 39 is inclined downwardly from a point upstream from inlet opening 20 within the exit end 34 of degreaser/defluxer 25 to its lowermost portion 39' beneath chilled air section 35 where a drain 42 is located to drain the solvent condensate from the chilled air section to achieve solvent recovery and reuse.

In accordance with a preferred feature of the invention, chilled air section 35 is actually divided into a low air temperature control section 35a on the "machine side" (i.e., in open communication with the working chamber through inlet 20 of control apparatus 10) and an ambient air temperature reducing section 35b on the "non-machine side" (i.e., in open communication with ambient air through outlet opening 47 of the conveyor flow path 18). A second set of chill coils 37', substantially identical to chill coils 37 and also connected to the coolant circuit 40, extends beneath the upwardly curved conveyor upper run section 30' in reducing section 35b to dehumidify ambient air entering the control apparatus 10 though outlet opening 47. Below the chill coils 37', the trough 39 is inclined upwardly towards the outlet opening 47 from its intermediate lowermost portion 39' located beneath the lowermost portion of the conveyor upper run 30' where it is provided with a drain 42' to collect and drain water condensate from the chilled air reducing section 35b.

Solvent condensate drain 42 and water condensate drain 42' are preferably separate drain structures to avoid the need for separating the solvent condensate from the water condensate. To further isolate solvent and water condensates, a partition 43 below the upper run 30' extends vertically and is sealed along its side edges 43a and bottom edge 43b to the side body members 14 and trough lowermost portion 39'. The partition 43, trough 39 and portions of side body members 14 extending between the trough and conveyor upper run 30' thereby define separate solvent and water condensate drain regions. With this arrangement, any ambient air entering the working chamber 22 through conveyor flow path 18 is essentially free of undesirable moisture that may impede the solvent cleaning process within degreaser/defluxer 25.

To reduce the amount of ambient air entering working chamber 22 and the creation of undesirable air movement therein, a baffling arrangement 50 is secured to top body member 16 and side body members 14 and extends above the conveyor upper run 30' to define the uppermost extent of the conveyor flow path 18 within chilled air section 35. More specifically, baffling arrangement 50 includes a first baffle 52 which is downwardly inclined in the low air temperature or solvent condensing section 35a in the direction of conveyance, and a second baffle 54 which is upwardly inclined within the ambient air reducing section 35b towards outlet 47. First baffle 52 has an upstream transverse edge 52a secured (e.g., by welding) to the lower surface of top body member 16, side edges 52b secured to inner surfaces of sides 14, and a downstream, transversely extending edge 52b secured to the upstream edge 54a of second baffle 54 preferably above the lowermost portion 35 of conveyor upper run 30'. The downstream transversely extending edge 54b of second baffle 54 is also secured (e.g., by welding) to top body member 16, with the side edges of the second baffle secured to the inner surfaces of sides 14.

It is a preferred feature of the present invention to form inlet and outlet openings 20,47 and the cross section of flow path 18 (i.e., between side body members 14, baffles 52 or 54, and upper conveyor run 30') to be as small as practical for transport of articles 32 therethrough while minimizing the amount of vapor flow. The cooling coils 37,37' cause preferential condensation to further reduce vapor and ambient air flow within the flow path and the cooling coils are operative to cool and condensate both the solvent vapor (within section 35a) and ambient air (within reducing section 35b) that does enter the flow path to prevent escape of any appreciable amount of solvent vapor from the outer ends of the flow path.

It is another preferred feature of the present invention to form the lowermost point of baffling arrangement 50 (i.e., defined by joined transverse edges 52b,54a) at a position which is approximately elevationally lower or elevationally equal to the bottom edges 20' or 47' of inlet and outlet openings 20,47 defined by the conveyor upper run 30' within those openings. It is also a preferred feature of this invention to locate the lowermost point of baffling arrangement 50 directly above the lowermost point of conveyor upper run 30' within the chilled air section 35. In this advantageous manner, all solvent laden articles 32 are forced to travel into the lowermost chilled air section 35 of conveyor flow path 18 for exposure of solvent vapors to the low condensing temperatures of the solvent condensing control section 35a. Likewise, any ambient air entering flow path 18 trough outlet opening 47 is constrained to flow beneath baffle 54 for exposure of all ambient air to the low temperatures of reducing section 35b where dehumidification occurs. Furthermore, by locating the lowermost section of baffling arrangement 50 at a position elevationally at or beneath openings 20,47, the movement of ambient air and subsequent creation of undesirable air exchange and movement within work chamber 22 is greatly inhibited to advantageously prevent vapor diffusion of the vapor zone 27.

Movement of ambient air within conveyor flow path 18 is also constrained by the provision of a flexible curtain 55 extending vertically within the flow path at the interface region between the low air temperature sections 35a,35b. More specifically, curtain 55 may include a set of soft bristles 56 extending the full width of flow path 18 via connection at their upper ends to a bristle holder 57 secured to the connected edges 52b,54a of baffles 52,54. The lowermost ends 55a of the curtain 55 may slightly contact or end just above the conveyor upper run 30'. The bristles are sufficiently soft so as to yield to the advancing movement of products 32 upon contact therewith.

Figure 3:
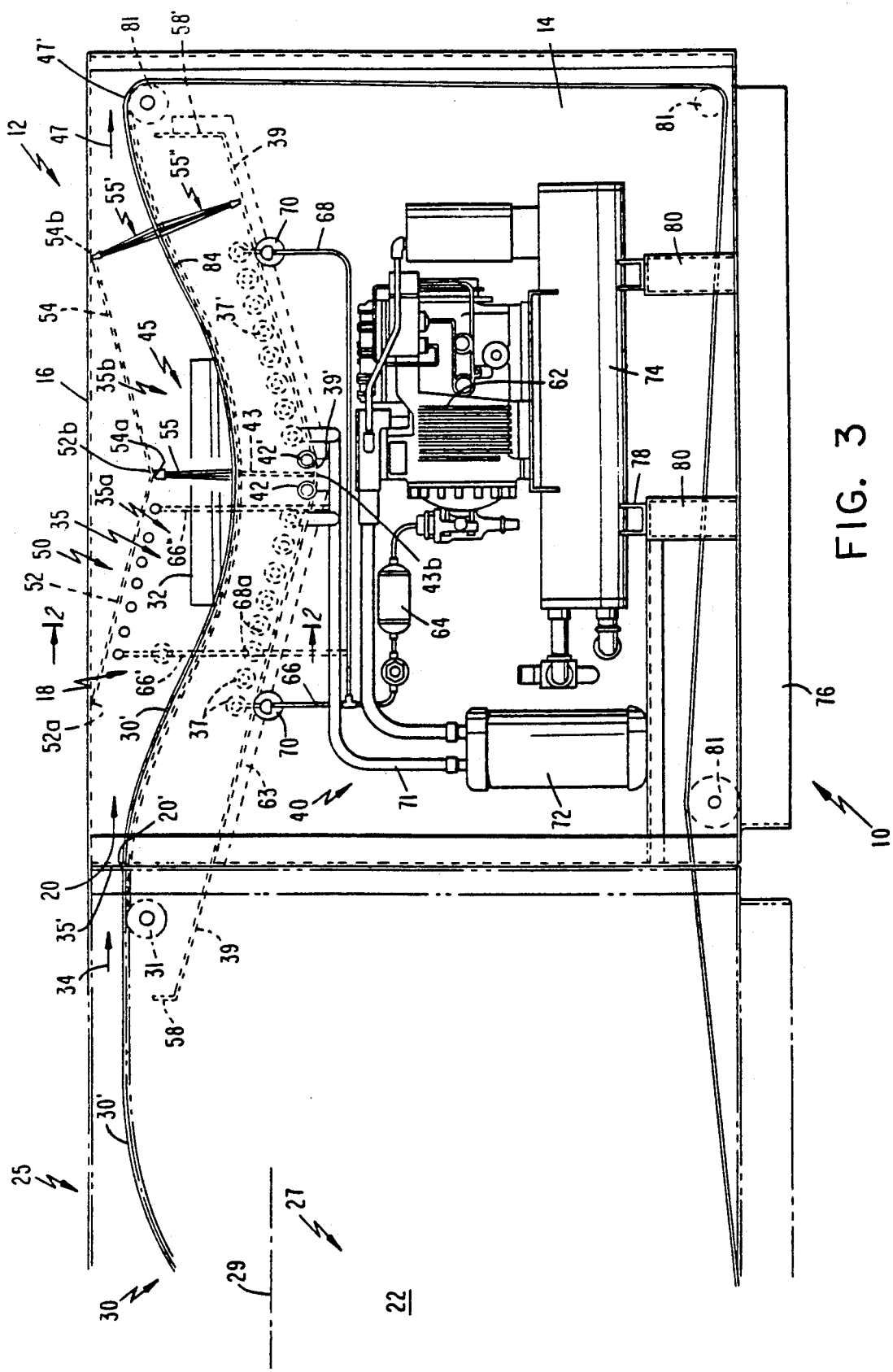
FIG. 3 is a vertical sectional view similar to FIG. 1 to depict further modifications to the FIG. 1 embodiment.

A second flexible curtain 55' which may be identical to the curtain 55 is preferably mounted within the discharge outlet 47 of the ambient air reducing section 35b so as to initially prevent movement of ambient air into the conveyor flow path 18 from the surrounding ambient working environment, as depicted in FIG. 3. Optionally, the flexible curtain 55' may be paired with another flexible curtain 55" extending between the trough bottom wall to which it is secured, with its uppermost free ends slightly contacting or terminating just beneath the conveyor upper run 30'.

The baffling arrangement 50 and curtain 55 advantageously cooperate to reduce the amount of air exchange between ambient air and the environment of work chamber 22 while facilitating a rapid movement of parts in and out of the work chamber notwithstanding the fact that degreaser/defluxer 25 remains open to ambient air although through the chilled and controlled conveyor flow path 18 of the present invention.

The conveyor flow path inlet opening 20 is preferably located above the elevation of the vapor line or upper limit 29 of vapor zone 27 to further impede the flow of solvent vapor from the vapor zone into the controlled flow path.

As best depicted in FIG. 2, the V-bottom trough 39 preferably extends the full width of housing 12 between side body members 14 to completely capture both solvent and water condensate in the manner described above. Insulation panels 63 may be secured to the underside of the trough 39 to thermally isolate the flow path 18 and particularly the chilled air section 35 from heat produced by coolant circuit 40 discussed infra. Furthermore, the upstream and downstream ends of trough 39 are preferably formed with upturned edges 58 and 58' that extend elevationally to the same elevation of the lowermost point (52b,54a) of baffling arrangement 50 (i.e., the point of connection between baffle edges 52b,54a. In this manner, the dense, cold air barrier provided by chilled air section 35 tends to be contained by the trough within the chilled air section.

The coolant circuit 40 may be constructed by one of ordinary skill in a known manner based upon the present specification. In the present preferred embodiment, coolant circuit 40 comprises a compressor 62 supplying liquid refrigerant to each of chilled coils 37,37' through a dryer 64 and refrigerant connect lines 66 and 68 containing expansion valves 70. Subsequent to flowing through chilled coils 37,37', refrigerant is returned to the compressor 62 via return lines 71, suction accumulator 72 and refrigerant condensing unit 74. The refrigerant condensing unit, compressor and suction accumulator are appropriately mounted to a base 76 of housing 12 via brackets 78 and supports 80. Thermal mass media 68a may be wrapped around chilled coils 37,37' to maintain cold temperatures within chilled air section 35 during periods of compressor shutdown or defrosting of the chill coils.

As mentioned above, coolant circuit 40 may be mounted within the cold air lock vapor seal housing 12 beneath the trough 39 with insulation panels 63 covering the bottom surfaces of the trough to thermally isolate the flow path 18 and chilled air section 35 thereof from heat produced by the refrigeration equipment of coolant circuit 40. Optionally, the said coolant circuit 40 may be suitably connected via refrigerant connect lines to a like solvent control apparatus 10 disposed at the opposite end of the degreaser or defluxer 25. As will also occur to one of ordinary skill in the art from a review of this specification, the coolant circuit 40 providing chilled refrigerant to the chill coils 37,37' to one or both of a solvent control apparatus 10 of the invention (in the latter embodiment the pair of apparatus being respectively mounted to the inlet and outlet ends of degreaser or defluxer 25) may be mounted external to the housing(s) 12 for connection to the chill coils via appropriate refrigerant connect lines.

In accordance with the present invention, an additional set of chill coils 37" may be mounted within the solvent condensing section 35a (on the "machine side" of the conveyor flow path) as schematically depicted in FIG. 3. The chill coils 37" extend adjacent the lower surface of first baffle 52 well above the conveyor upper run to provide sufficient clearance with respect to product being conveyored within the flow path 18 and to ensure condensation of any solvent vapors flowing upwardly towards or along the lower surface of the first baffle. Chilled liquid refrigerant is supplied to the chill coils 37" through a refrigerant connect line 66' with a return line 66" delivering spent refrigerant from the chill coil 37" to the compressor 62. Thermal mass media (not shown) may also be wrapped around these chill coils 37". Another set of chill coils (not shown), of similar construction to chill coils 37,37',37" may be provided within the ambient air reducing section 35b to extend immediately below the lower surface of second baffle 54 to assist the chill coils 37' in dehumidifying ambient air.

In the presently preferred embodiment, the wire type conveyor belt of upper run 30' is an extension of the existing conveyor within the degreaser/defluxer 25. Suitable driven rolls or sprockets 81 extending transversely within the two lower corners and the upper corner of outlet opening 47 define the conveyor upper run 30' and the lower run within the housing. Curved guides 84 secured to side body members 14 assist in defining the curvature of upper run 30' between the inlet and outlet openings 20,47 and within chilled air section 35.

It is within the scope of the present invention to form conveyor upper run 30' within flow path 18 as a separate conveyor system with an appropriate drive mechanism (not shown) that may be mounted within a lower portion of housing 12.

It is also within the scope of this invention to convey articles 32 with other types of conveyor equipment (e.g., a monorail system) as will occur to one of ordinary skill in the art upon review of this specification.

Controlled air apparatus 10 may be located at one or both of the entrance and exit ends to degreaser/defluxer 25 as retrofit additions to existing degreasers and defluxers which are presently being sold without the temperature controlled conveyor flow path provided by the present invention. Furthermore, in the production of new equipment, control apparatus 10 may be incorporated into the degreaser/defluxer tank on one or both ends of working chamber 22 by appropriate modification of the entrance and exit ends of the degreasing/defluxing tank in the manner provided for herein.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

We claim:

1. Vapor control arrangement for limiting outflux of a solvent vapor from a solvent degreaser having a vessel and a conveyor for passing articles to be degreased into the vessel into intimate contact with the solvent or a vapor phase thereof, said control arrangement comprising:
   (a) a housing being open at one end to the vessel interior and solvent vapor therein and at the other end to ambient air;
   (b) means within said housing for establishing (1) a low air temperature control section and (2) an ambient air temperature reducing section in communication with ambient air;
   (c) means for conveying said articles from the vessel interior through at least the low air temperature control section;
   (d) said low air temperature control section including (i) means for cooling the low air temperature control section to a first predetermined temperature below a boiling temperature of said solvent to thereby enable condensation of solvent vapor in the control section, and (ii) means for collecting and draining solvent condensate from the control section;
   (e) said ambient air temperature reducing section including (i) means for cooling the ambient air temperature reducing section to a second predetermined temperature sufficient to condense water vapor in the ambient air entering the reducing section to thereby dehumidify the air, and (ii) means for collecting and draining the water condensate from the reducing section; and further including curtain means disposed between the control section and reducing section for impeding the transfer of air between the control section and the reducing section.

2. The arrangement of claim 1, wherein said conveying means includes a conveyor having an upper run along which said articles are conveyed to or from the vessel interior through the control section, said upper run including an inlet end and an outlet end at opposite ends of the control section.

3. Vapor control arrangement for limiting outflux of a solvent vapor from a solvent degreaser having a vessel and a conveyor for passing articles to be degreased into the vessel into intimate contact with the solvent or a vapor phase thereof, said control arrangement comprising:
   (a) a housing being open at one end to the vessel interior and solvent vapor therein and at the other end to ambient air;
   (b) means within said housing for establishing (1) a low air temperature control section and (2) an ambient air temperature reducing section in communication with ambient air;
   (c) means for conveying said articles from the vessel interior through at least the low air temperature control section;
   (d) said low air temperature control section including (i) means for cooling the low air temperature control section to a first predetermined temperature below a boiling temperature of said solvent to thereby enable condensation of solvent vapor in the control section, and (ii) means for collecting and draining solvent condensate from the control section;
   (e) said ambient air temperature reducing section including (i) means for cooling the ambient air temperature reducing section to a second predetermined temperature sufficient to condense water vapor in the ambient air entering the reducing section to thereby dehumidify the air, and (ii) means for collecting and daining the water condensate from the reducing section;
   wherein said conveying means includes a conveyor having an upper run along which said articles are conveyed to or from the vessel interior through the control section, said upper run including an inlet end and an outlet end at opposite ends of the control section;
   further including guide means for supporting the conveyor upper run in the control section, said guide means having a downward curvature or inclination locating the inlet end elevationally above the outlet end.

4. The arrangement of claim 3, further including a baffle disposed above the upper run to define an uppermost extent of the conveyor flow path in the control section.

5. The arrangement of claim 4, wherein said baffle is inclined downwardly towards the outlet end of the control section to impede the flow of air from the control section towards the inlet end.

6. The arrangement of claim 5, wherein said collecting and draining means in the control section includes a trough disposed beneath the conveyor and a solvent condensate drain for draining solvent condensate from the control section.

7. The arrangement of claim 2, wherein said conveyor extends from the control section through the reducing section.

8. Vapor control arrangement for limiting outflux of a solvent vapor from a solvent degreaser having a vessel and a conveyor for passing articles to be degreased into the vessel into intimate contact with the solvent or a vapor phase thereof, said control arrangement comprising:

(a) a housing being open at one end to the vessel interior and solvent vapor therein and at the other end to ambient air;

(b) means within said housing for establishing (1) a low air temperature control section and (2) an ambient air temperature reducing section in communication with ambient air;

(c) means for conveying said articles from the vessel interior through at least the low air temperature control section;

(d) said low air temperature control section including (i) means for cooling the low air temperature control section to a first predetermined temperature below a boiling temperature of said solvent to thereby enable condensation of solvent vapor in the control section, and (ii) means for collecting and draining solvent condensate from the control section;

(e) said ambient air temperature reducing section including (i) means for cooling the ambient air temperature reducing section to a second predetermined temperature sufficient to condense water vapor in the ambient air entering the reducing section to thereby dehumidify the air, and (ii) means for collecting and daining the water condensate from the reducing section;

wherein said conveying means includes a conveyor having an upper run along which said articles are conveyed to or from the vessel interior through the control section, said upper run including an inlet end and an outlet end at opposite ends of the control section;

wherein said conveyor extends from the control section through the reducing section;

further including guide means for supporting the conveyor upper run in the control section, said guide means having a downward curvature or inclination locating the inlet end elevationally above the outlet end, said guide means also supporting the conveyor upper run in the reducing section, said guide means having an upward curvature or inclination locating the inlet opening of the reducing section, formed adjacent the outlet end of the control section, elevationally below an outlet opening of the reducing section, thereby an interface region between the outlet end of the control section and the inlet opening of the reducing section is the lowest point of the conveyor upper run in the control arrangement.

9. The arrangement of claim 8, further including a first baffle disposed above the upper run to define an uppermost extent of the conveyor flow path in the control section, said first baffle being inclined downwardly towards the outlet end of the control section to impede the flow of air from the control section towards the inlet end, and further including a second baffle disposed above the upper run to define the uppermost extent of the conveyor flow path in the reducing section, said baffle portion being inclined upwardly towards the outlet opening of the reducing section to impede the flow air from the reducing section towards said inlet end of the control section, whereby said guide means and baffles establish a lowermost point of the conveyor flow path proximate the interface region between the control section and the reducing section.

10. The arrangement of claim 9, further including curtain means disposed in the interface region to extend within the flow path between the baffles and conveyor upper run for impeding the transfer of air between the control section and the reducing section.

11. The arrangement of claim 10, wherein said curtain means is movable upon contact with conveyed articles in the flow path to enable conveyance of said articles from the control section to the reducing section along the upper run.

12. The arrangement of claim 1, wherein said vessel includes a conveyor for conveying articles through a vapor zone within the vessel interior, said conveyor means in the control arrangement being an extension of said conveyor.

13. Solvent vapor control arrangement for limiting outflux of a solvent vapor from a solvent degreaser, comprising:

(a) a housing;

(b) means within said housing for defining a conveyor path having an inlet opening and an outlet opening through which articles subjected to solvent degreasing respectively enter and exit from the housing;

(c) baffle means mounted within said housing for defining an uppermost extent of said conveyor flow path; and (d) means within said housing for establishing a low air temperature control region in the conveyor flow path, below the baffle means, be maintaining air in the flow path at a temperature below a boiling temperature of said solvent to thereby enable condensation of solvent vapor from the degreaser to occur in the flow path, and means for collecting and draining solvent condensate from the flow path.

14. Solvent vapor control arrangement for limiting outflux of a solvent vapor from a solvent degreaser, comprising:

(a) a housing;

(b) means within said housing for defining a conveyor path having an inlet opening and an outlet opening through which articles subjected to solvent degreasing respectively enter and exit from the housing;

(c) baffle means for defining an uppermost extent of said conveyor flow path; and (d) means within said housing for establishing a low air temperature control region in the conveyor flow path, below the baffle means, by maintaining air in the flow path at a temperature below a boiling temperature of said solvent to thereby enable condensation of solvent vapor from the degreaser to occur in the flow path, and means for collecting and draining solvent condensate from the flow path;

wherein one of the inlet or outlet openings, adapted to be in communication with a vapor zone in the degreaser through an associated entrance or exit end of the degreaser, is located elevationally above the vapor zone to impede the entry of solvent vapor in the vapor zone into the conveyor flow path.

15. Solvent vapor control arrangement for limiting outflux of a solvent vapor from a solvent degreaser, comprising:

(a) a housing;

(b) means within said housing for defining a conveyor path having an inlet opening and an outlet opening through which articles subjected to solvent degreasing respectively enter and exit from the housing;

(c) baffle means for defining an uppermost extent of said conveyor flow path; and (d) means within said housing for establishing a low air temperature control region in the conveyor flow path, below the baffle means, by maintaining air in the flow path at a temperature below a boiling temperature of said solvent to thereby enable condensation of solvent vapor from the degreaser to occur in the flow path, and means for collecting and draining solvent condensate from the flow path;

wherein the baffle means and the conveyor flow path are arranged to define a low point in the flow path which low point is elevationally below an adjacent one of the inlet and outlet openings of the flow path.

16. The arrangement of claim 15, wherein the low point of the flow path is elevationally below a lowermost edge of each of the inlet and outlet openings.

17. The arrangement of claim 15, wherein the low air temperature control region is located at the low point, whereby each article conveyed through the flow path enters the low air temperature control section.

18. The arrangement of claim 17, wherein said baffle means includes a first baffle portion in the flow path which is inclined downwardly from the said one of the inlet or outlet openings located adjacent the associated entrance or exit end toward the low point and a second baffle portion, connected to the first baffle portion at the low point, which is inclined upwardly from the low point towards the said one of the inlet or outlet openings located remote from the associated entrance or exit end.

19. The arrangement of claim 18, further including curtain means disposed within the flow path at the low point to extend between the baffle portions and the conveyor upper run for impeding the transfer of air from the said one of the inlet or outlet openings in communication with ambient air to the other of the inlet or outlet openings in communication with the vapor zone.

20. The arrangement of claim 15, further including means for connecting the housing to a conveyor exit end of the degreaser.

21. The arrangement of claim 15, wherein said housing is integrally formed at an exit end of the degreaser.

22. The control arrangement of claim 15, wherein a pair of identical said control arrangements are provided at both the entrance and exit ends of the degreaser.

23. A method of limiting outflux of a solvent vapor from a degreaser containing a supply of solvent through which degreaser articles to be degreased are conveyed from an entrance end of the degreaser for discharge through an exit end, comprising the steps of:

(a) conveying said articles from the entrance end into contact with at least one of said solvent supply or a vapor zone thereof;

(b) directing said articles from contact with the solvent supply or vapor thereof through the conveyor exit end;

(c) causing said articles to pass through a conveyor flow path in said exit end provided with chilled air in a section of the flow path which is elevationally lower than flow path sections in said exit end respectively disposed upstream and downstream from the chilled air section; and (d) collecting solvent liquid condensed within the chilled air section.

24. The method of claim 23, wherein a first part of the chilled air section is in communication with the solvent in the degreaser.

25. The method of claim 24, wherein a second part of the chilled air section is in communication with ambient air.

26. The method of claim 25, wherein said second part of the chilled air section dehumidifies ambient air within the second part and comprising the further step of draining water condensate from the second part.

27. A method of limiting outflux of a solvent vapor from a degreaser containing a supply of solvent through which degreaser articles to be degreaser are conveyed from an entrance end of the degreaser for discharge through an exit end, comprising the steps of:

(a) conveying said articles from the entrance end into contact with at least one of said solvent supply or a vapor zone thereof;

(b) directing said articles from contact with the solvent supply or vapor thereof through the conveyor exit end;

(c) causing said articles to pass through a conveyor flow path in said exit end provided with chilled air in a section of the flow path which is elevationally lower than flow path sections disposed upstream and downstream from the chilled air section; and (d) collecting solvent liquid condensed within the chilled air section;

wherein a first part of the chilled air section is in communication with the solvent in the degreaser;

wherein a second part of the chilled air section is in communication with ambient air;

wherein said second part of the chilled air section dehumidifies ambient air within the second part and comprising the further step of draining water condensate from the second part;

comprising the further step of passing articles through a curtain physically disposed between the first and second sections of the chilled air section and which curtain is yieldable upon the second section.

28. The method of claim 23, wherein said articles pass into an inlet of the conveyor flow path which is elevationally above a vapor zone within the degreaser in communication with the inlet.

29. A method of limiting outflux of a solvent vapor from a degreaser containing a supply of solvent through which degreaser articles to be degreased are conveyed from an entrance end of the degreaser for discharge through an exit end, comprising the steps of:

(a) conveying said articles from the entrance end into contact with at least one of said solvent supply or a vapor zone thereof;

(b) directing said articles from contact with the solvent supply or vapor thereof through the conveyor exit end;

(c) causing said articles to pass through a conveyor flow path in said exit end provided with chilled air in a section of the flow path which is elevationally lower than flow path sections disposed upstream and downstream from the chilled air section; and (d) collecting solvent liquid condensed within the chilled air section;

wherein said articles pass beneath a baffle having a low point in relation to portions of the baffle immediately adjacent the low point and inclined upwardly from the low point, wherein the low point is disposed in the chilled air section.

30. Vapor control arrangement for limiting outflux of a solvent vapor from a solvent degreaser having a vessel and a conveyor for passing articles to be degreased into a vessel into intimate contact with the solvent or a vapor phase thereof, said control arrangement comprising:

(a) a housing being open at one end to the vessel interior and solvent vapor therein and at the other end to ambient air;

(b) means within said housing for establishing (1) a low air temperature control section and (2) an ambient air temperature reducing section in communication with ambient air;

(c) means for conveying said articles from the vessel interior through at least the low air temperature control section;

(d) said low air temperature control section including (i) means for cooling the low air temperature control section to a first predetermined temperature below a boiling temperature of said solvent to thereby enable condensation of solvent vapor in the control section, and (ii) means for collecting and draining solvent condensate from the control section;

(e) said ambient air temperature reducing section including (i) means for cooling the ambient air temperature reducing section to a second predetermined temperature sufficient to condense water vapor in the ambient air entering the reducing section to thereby dehumidify the air, and (ii) means for collecting and daining the water condensate from the reducing section;

further including curtain means disposed in an interface region between the low air temperature control section and the ambient air temperature reducing section to extend within the flow path between the conveying means and an overhead portion of the housing for impeding the transfer of air between the control section and the reducing section.

31. The arrangement of claim 30, wherein said curtain means is movable on contact with conveyed articles in the flow path to enable conveyance of said articles from the control section to the reducing section along the upper run.

32. Solvent vapor control arrangement for limiting outflux of a solvent vapor from a solvent degreaser, comprising:

(a) a housing;

(b) means within said housing for defining a conveyor path having an inlet opening and an outlet opening through which articles subjected to solvent degreasing respectively enter and exit from the housing;

(c) baffle means for defining an uppermost extent of said conveyor flow path; and (d) means within said housing for establishing a low air temperature control region in the conveyor flow path, below the baffle means, by maintaining air in the flow path at a temperature below a boiling temperature of said solvent to thereby enable condensation of solvent vapor from the degreaser to occur in the flow path, and means for collecting and draining solvent condensate from the flow path;

further including curtain means disposed within the flow path to extend between the baffle means and a floor of the conveyor flow path intermediate the inlet opening and outlet opening thereof, wherein said curtain means is movable upon contact with conveyed articles in the flow path to enable continuous conveyance of the articles along the upper run from the inlet opening to the outlet opening, further including second curtain means spaced downstream from the said curtain means and disposed to extend within the flow path between the baffle means and conveyor upper run within the outlet opening.

33. The arrangement of claims 1, wherein said cooling means includes a coolant circuit having a cooling coil means disposed in the control section and the reducing section, respectively, beneath the conveyor means, wherein said cooling means includes an additional cooling coil means disposed in the control section above the conveyor means and adjacent a lower surface of the first baffle defining the upper region of the flow path.

34. The arrangement of claim 33, further including second curtain means disposed in the outlet opening of the ambient air temperature reducing section to extend within the flow path between the baffles and conveyor upper run for impeding the entry of ambient air from the working environment into the reducing section.

35. The control arrangement of claim 15, wherein said low air temperature region and the low point of the conveyor flow path is in an exit end of the housing portion adjacent ambient environment.

36. The control arrangement of claim 15, wherein said low air temperature region and the low point of the conveyor flow path is in an entrance end of the housing potion adjacent ambient environment.

37. The control arrangement of claim 35, further including a said low air temperature control region and a said low point in the entrance end of the housing portion as well as the exit end.

* * * * *